United States Patent
Hills et al.

(10) Patent No.: US 7,926,705 B2
(45) Date of Patent: Apr. 19, 2011

(54) METHOD AND SYSTEM FOR USING A RECORDING DEVICE IN AN INSPECTION SYSTEM

(75) Inventors: Steven Leslie Hills, San Jose, CA (US); Ronald Alan Gatten, Pleasanton, CA (US)

(73) Assignee: Morpho Detection, Inc., Newark, CA (US)

( * ) Notice: Subject to any disclaimer, the term of this patent is extended or adjusted under 35 U.S.C. 154(b) by 555 days.

(21) Appl. No.: 11/737,973

(22) Filed: Apr. 20, 2007

(65) Prior Publication Data

US 2008/0257949 A1 Oct. 23, 2008

(51) Int. Cl.
*G06F 17/00* (2006.01)
*G06K 7/00* (2006.01)
*G06K 7/10* (2006.01)
*G06K 19/02* (2006.01)
*G01N 23/04* (2006.01)
*H04N 7/18* (2006.01)

(52) U.S. Cl. ... 235/375; 235/487; 235/435; 235/462.01; 378/57; 348/143; 340/572.1

(58) Field of Classification Search ............... 340/572.1; 378/57; 382/143; 235/435, 487, 375, 462.01, 235/385, 425, 454
See application file for complete search history.

(56) References Cited

U.S. PATENT DOCUMENTS

| | | | | |
|---|---|---|---|---|
| 3,752,312 A | | 8/1973 | Soltanoff | |
| 3,919,467 A | * | 11/1975 | Peugeot | 378/98.2 |
| 4,020,346 A | * | 4/1977 | Dennis | 378/57 |
| 4,216,499 A | * | 8/1980 | Kunze et al. | 378/98.2 |
| 4,711,994 A | * | 12/1987 | Greenberg | 235/384 |
| 4,759,047 A | * | 7/1988 | Donges et al. | 378/57 |
| 5,051,565 A | * | 9/1991 | Wolfram | 235/384 |
| 5,299,116 A | * | 3/1994 | Owens et al. | 705/28 |
| 5,319,547 A | * | 6/1994 | Krug et al. | 705/13 |
| 5,490,218 A | * | 2/1996 | Krug et al. | 382/100 |
| 5,600,303 A | * | 2/1997 | Husseiny et al. | 340/568.1 |
| 5,920,053 A | * | 7/1999 | DeBrouse | 235/375 |
| 6,301,327 B1 | | 10/2001 | Martens et al. | |
| 6,707,879 B2 | * | 3/2004 | McClelland et al. | 378/57 |
| 6,721,391 B2 | * | 4/2004 | McClelland et al. | 378/57 |
| 6,970,088 B2 | * | 11/2005 | Kovach | 340/572.1 |
| 7,016,459 B2 | | 3/2006 | Ellenbogen et al. | |
| 7,039,154 B1 | | 5/2006 | Ellenbogen et al. | |
| 7,123,681 B2 | | 10/2006 | Ellenbogen et al. | |
| 7,139,406 B2 | * | 11/2006 | McClelland et al. | 382/100 |
| 7,164,747 B2 | | 1/2007 | Ellenbogen et al. | |
| 7,317,390 B2 | * | 1/2008 | Huey et al. | 340/552 |
| 7,492,262 B2 | * | 2/2009 | Washington | 340/572.1 |
| 7,505,557 B2 | * | 3/2009 | Modica et al. | 378/57 |

(Continued)

FOREIGN PATENT DOCUMENTS

WO WO 2007072527 A1 * 6/2007

*Primary Examiner* — Daniel Walsh
(74) *Attorney, Agent, or Firm* — Armstrong Teasdale LLP

(57) ABSTRACT

In one aspect, a method of using a recording device in a luggage inspection system is provided. The method includes establishing an inspection workstation including an inspection area and a scanner, and providing a user interface. The method also includes positioning the recording device to record at least one luggage inspection, scanning an identification number, and storing the identification number by date and time. Moreover, the method includes inspecting contents of at least one item of luggage, recording the luggage inspection and associating the identification number with a corresponding luggage inspection.

20 Claims, 5 Drawing Sheets

U.S. PATENT DOCUMENTS

| | | | |
|---|---|---|---|
| 2002/0040928 A1* | 4/2002 | Jalili et al. | 235/385 |
| 2002/0139853 A1* | 10/2002 | Tsikos et al. | 235/462.01 |
| 2002/0176531 A1* | 11/2002 | McClelland et al. | 378/57 |
| 2002/0176532 A1* | 11/2002 | McClelland et al. | 378/57 |
| 2002/0186862 A1* | 12/2002 | McClelland et al. | 382/100 |
| 2002/0198731 A1* | 12/2002 | Barnes et al. | 705/1 |
| 2003/0023592 A1* | 1/2003 | Modica et al. | 707/6 |
| 2003/0189094 A1* | 10/2003 | Trabitz | 235/385 |
| 2003/0236716 A1* | 12/2003 | Manico et al. | 705/27 |
| 2004/0052403 A1* | 3/2004 | Houvener | 382/115 |
| 2004/0117638 A1* | 6/2004 | Monroe | 713/186 |
| 2004/0124982 A1* | 7/2004 | Kovach | 340/572.1 |
| 2004/0136602 A1* | 7/2004 | Nagaraj et al. | 382/240 |
| 2004/0223054 A1* | 11/2004 | Rotholtz | 348/143 |
| 2005/0008119 A1* | 1/2005 | McClelland et al. | 378/57 |
| 2005/0031076 A1* | 2/2005 | McClelland et al. | 378/57 |
| 2005/0036689 A1* | 2/2005 | Mahdavieh | 382/199 |
| 2006/0081697 A1* | 4/2006 | Brinton et al. | 235/377 |
| 2006/0215811 A1* | 9/2006 | Modica et al. | 378/57 |
| 2007/0122003 A1* | 5/2007 | Dobkin et al. | 382/115 |
| 2007/0195994 A1* | 8/2007 | McClelland et al. | 382/103 |
| 2007/0286338 A1* | 12/2007 | Sykes et al. | 378/57 |
| 2008/0044801 A1* | 2/2008 | Modica et al. | 434/307 R |
| 2008/0198967 A1* | 8/2008 | Connelly et al. | 378/57 |
| 2009/0091452 A1* | 4/2009 | Himmel | 340/572.1 |
| 2009/0174554 A1* | 7/2009 | Bergeron et al. | 340/568.1 |
| 2009/0231134 A1* | 9/2009 | Modica et al. | 340/568.1 |
| 2009/0276089 A1* | 11/2009 | Bartholomew | 700/235 |

* cited by examiner

METHOD AND SYSTEM FOR USING A RECORDING DEVICE IN AN INSPECTION SYSTEM

BACKGROUND OF THE INVENTION

This invention relates generally to digital video recorders and, more particularly, to methods and systems for using digital video recorders in inspection systems.

Generally, known digital video recorders used for security simply record events by date and time. Consequently, with known digital video recorders there is no link between recorded security video footage and the recorded event. For example, airport security inspects each piece of luggage and each inspection is an event recorded by security cameras. Because known security cameras simply record by date and time, there is no link between the digitally recorded inspection and the luggage inspected. Thus, when a customer claims that personal items have been damaged or are missing due to a manual luggage inspection, hours of recorded video are reviewed to apparently identify the corresponding luggage inspection in the security video footage. However, although a particular piece of luggage recorded in the security video may appear to be the complaining customer's luggage, using such methods it is difficult to positively identify a particular piece of luggage.

BRIEF DESCRIPTION OF THE INVENTION

In one aspect, a method of using a recording device in a luggage inspection system is provided. The method includes establishing an inspection workstation including an inspection area and a scanner, and providing a user interface. The method also includes positioning the recording device to record at least one luggage inspection, scanning an identification number, and storing the identification number by date and time. Moreover, the method includes inspecting contents of at least one item of luggage, recording the luggage inspection and associating the identification number with a corresponding luggage inspection.

In another aspect, a system for recording information pertaining to a luggage inspection is provided. The system includes an inspection workstation including an inspection area, a scanner, and a user interface including a recording unit. A recording device is configured to record at least one luggage inspection and is operatively coupled to the user interface. The recording unit is configured to store the at least one luggage inspection. The system also includes an identification number stored by date and time, wherein the at least one luggage inspection stored on the recording unit corresponds to the identification number, such that entering the identification number into the user interface facilitates viewing the at least one luggage inspection stored on the recording unit.

In yet another aspect, an apparatus for viewing luggage inspections is provided. The apparatus includes an inspection area, a scanner and a user interface including a recording unit. A recording device is configured to record a luggage inspection in the inspection area. The recording device is operatively coupled to the user interface and the recording unit is configured to store the luggage inspection. An identification number is detected by the scanner and is stored by date and time. An inspection stored on the recording unit corresponds to the identification number, such that entering the identification number into the user interface facilitates viewing the luggage inspection stored on the recording unit.

DETAILED DESCRIPTION OF THE INVENTION

Figure 1:
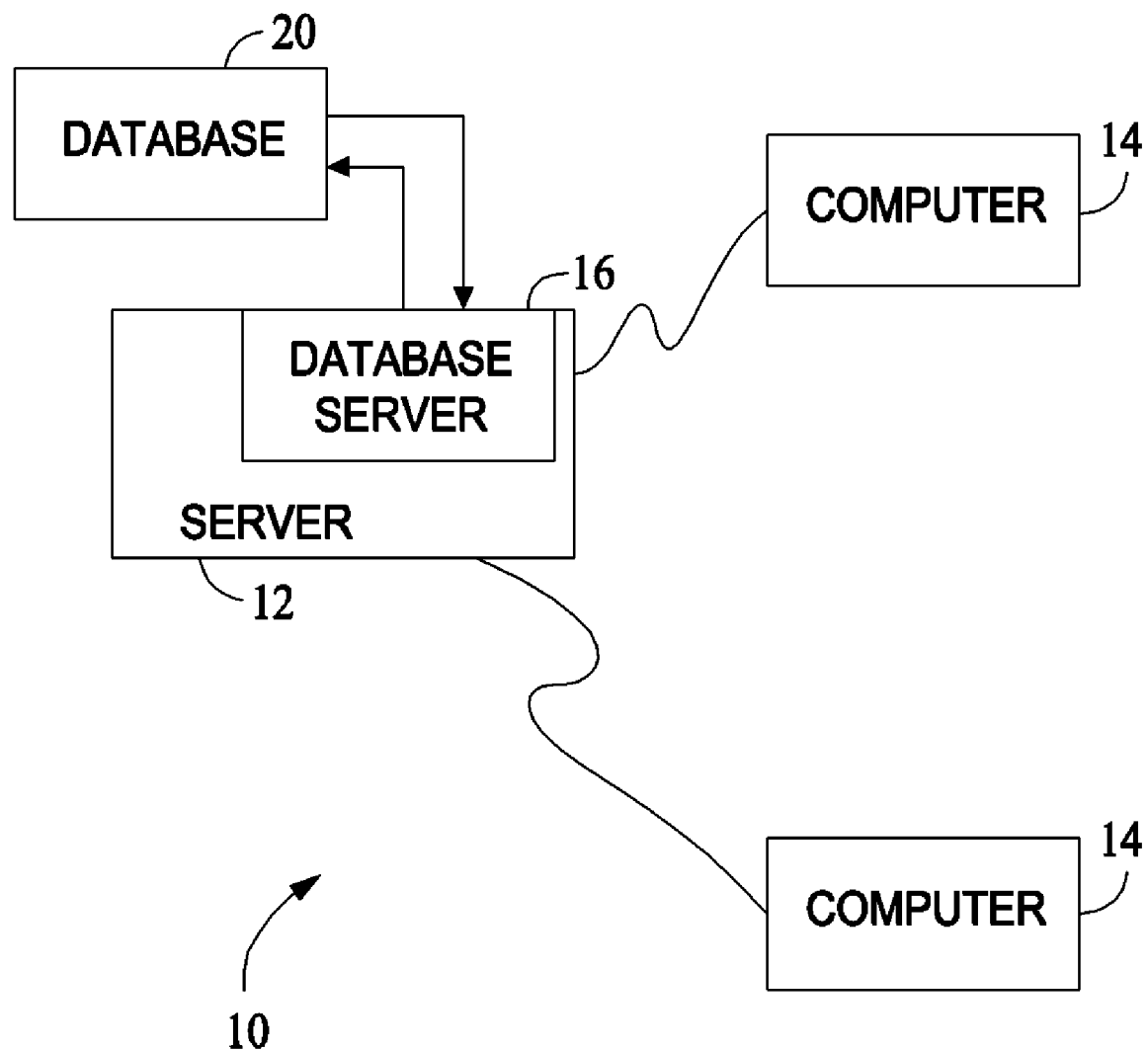
FIG. 1 is a simplified block diagram of a DVR User Interface System in accordance with one embodiment of the present invention.

The methods and systems described herein facilitate reducing the time required to locate and accurately identify luggage inspection video footage typically recorded at airport inspection workstations. The methods and systems described herein are believed to be applicable to many different businesses for reducing the time required to accurately record luggage inspections and quickly retrieve the inspection video footage for review. The example embodiment described herein is the transportation security business. Although the transportation security business is the example business described herein, the invention is in no way limited to the transportation security business. For example, the invention may also be used to verify proper package handling by freight carriers. It should be appreciated that the term "luggage" as used herein includes any item transported on a craft, such as a train, plane, boat or automobile. Such item includes, but is not limited to, suitcases, boxes, trunks, carry-on bags or any kind of baggage.

Exemplary embodiments of systems and processes that facilitate integrated network-based electronic verification of proper manual luggage inspection are described below in detail. The systems and processes facilitate, for example, reducing the time required to search recorded video for a luggage inspection event using an Inspection Workstation Security (IWS) system. A technical effect of the systems and processes described herein include at least one of permitting an entity to accurately and quickly identify a luggage inspection event. More specifically, in the example embodiment, airport security businesses or other entities engaged in the business of providing luggage inspection services in airports, utilize the methods and systems of the example embodiment to quickly and accurately verify proper manual inspection of luggage.

In the exemplary embodiment, the IWS system is utilized to quickly and accurately verify proper manual inspection of luggage. At least some of the parties that may be involved in these systems and processes include airports, system administrators, security personnel and travelers. Airports provide facilities for aircraft, for security personnel conducting manual luggage inspections and for travelers who are passengers on aircraft. The system administrator refers to the individuals who maintain the IWS system. Security personnel refers to those individuals who manually inspect luggage intended for transport on aircraft and accurately locate and identify recordings of luggage inspections using the IWS system.

In the example embodiment, users of the IWS system are able to perform many tasks, such as, but not limited to, quickly and accurately identifying and displaying manual luggage inspections. In the example embodiment, the IWS system includes an inspection workstation area having a DVR User Interface system, a digital video recorder and communication links. The inspection area is electronically coupled to the digital video recorder by a communications link. The DVR User interface is electronically coupled to the digital video recorder using another communications link such that they communicate with each other.

In the example embodiment, an item of luggage is processed through an airport inspection workstation area. During processing through the area, the digital video recorder records the actual manual luggage inspection event, inspection date and time, as well as a Bag Identification Number (BIN). Because the DVR User Interface communicates with the digital video recorder, the DVR User Interface is able to display luggage inspections corresponding to particular BINs. Recording the BIN and associated information creates a link between the luggage inspection video and the inspected luggage. This link enables quickly and accurately retrieving and viewing manual luggage inspection video footage on the DVR User Interface System for any piece of manually inspected luggage.

It should be appreciated that although the example discussed above is from the transportation security business, the IWS system may be used in any other business or field of endeavor requiring accurate identification and location of recorded events or items. However, it should be further appreciated that other businesses or organizations may define different criteria for identifying items that are tailored to the particular business, and that for each business, item identification criteria may be different.

In one embodiment, a computer program is provided, and the program is embodied on a computer readable medium and utilizes a Structured Query Language (SQL) with a user interface for administration and an interface for standard input and generating reports. In an exemplary embodiment, the system is run on a business-entity intranet. In a further exemplary embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independently and separately from other components and processes described herein. Each component and process also can be used in combination with other assembly packages and processes.

FIG. 1 is a simplified block diagram of a DVR User Interface (DVRUI) system 10 including a server system 12, and a plurality of client sub-systems, also referred to as client systems 14, connected to server system 12. Computerized modeling and grouping tools, as described below in more detail, are stored in server 12 and can be accessed by a requester at any one of computers 14. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
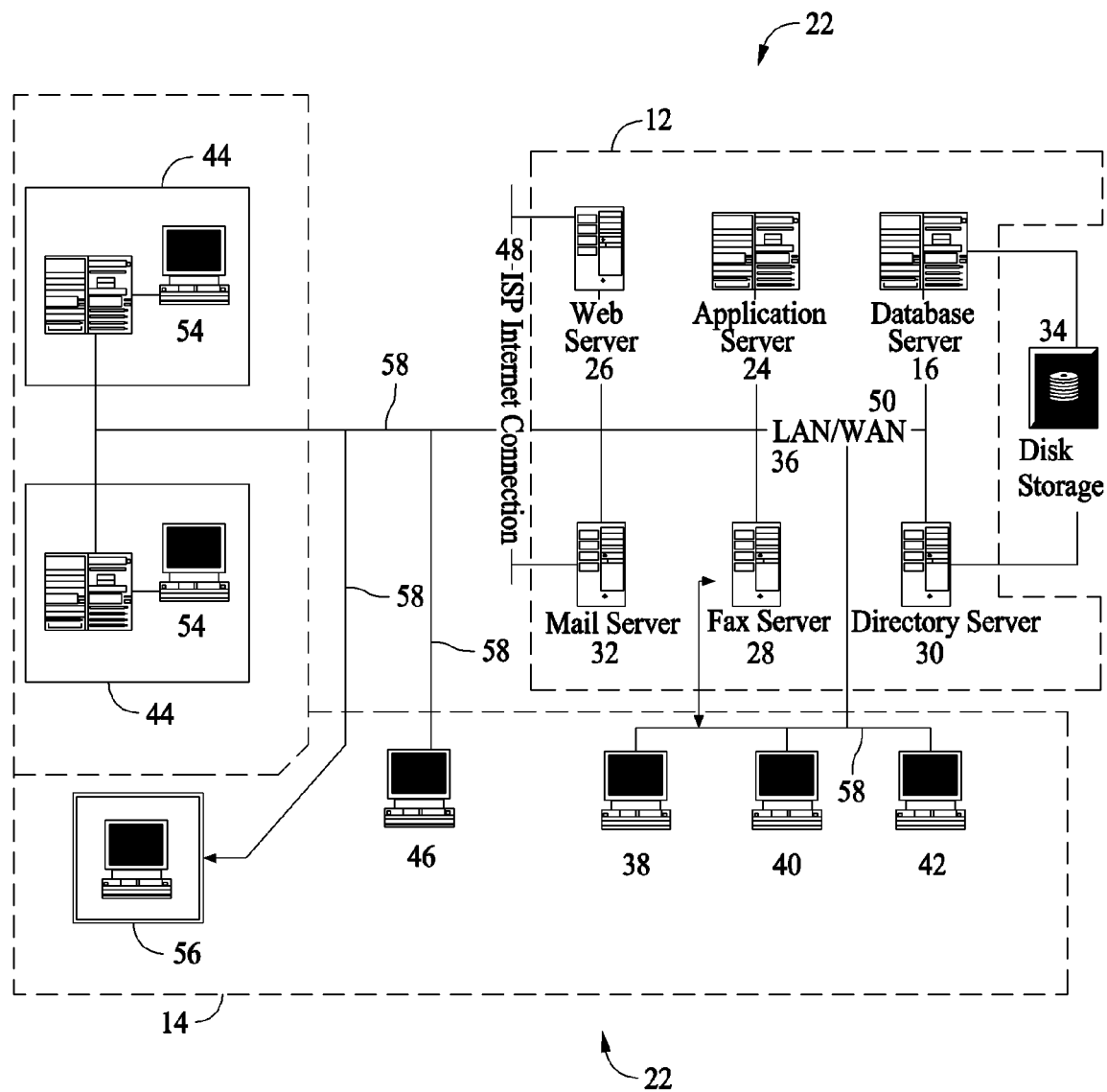
FIG. 2 is an expanded version block diagram of an example embodiment of a server architecture of the DVR User Interface System.

FIG. 2 is an expanded block diagram of an exemplary embodiment of a server architecture of DVRUI system 22. Components in DVRUI system 22, identical to components of system 10 (shown in FIG. 1), are identified in FIG. 2 using the same reference numerals as used in FIG. 1. DVRUI System 22 includes server system 12 and client systems 14. Server system 12 further includes database server 16, an application server 24, a web server 26, a fax server 28, a directory server 30, and a mail server 32. A digital video recording unit 34 is coupled to database server 16 and directory server 30. In the example embodiment, digital video recording unit 34 is a collection of hard drives. It should be appreciated that although the example embodiment describes recording unit 34 as a collection of hard drives, in other embodiments, recording unit 34 may include devices, such as, but not limited to, flash drives or any type of solid state memory device that enables DVRUI system 22 to function as described herein. Servers 16, 24, 26, 28, 30, and 32 are coupled in a local area network (LAN) 36. In addition, a system administrator's workstation 38, a user workstation 40, and a supervisor's workstation 42 are coupled to LAN 36.

Each workstation, 38, 40, and 42 is a personal computer. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., clients/customers 46, using LAN 36. The communication in the exemplary embodiment is illustrated as being performed using LAN 36, however, any other wide area network (WAN) type communication can be utilized in other embodiments, i.e., the systems and processes are not limited to being practiced using LAN 36. In addition, and rather than LAN 36, wide area network 50 or the Internet could be used in place of LAN 36.

In the exemplary embodiment, any authorized individual having a workstation 54 can access DVRUI system 22. At least one of the client systems includes a manager workstation 56. Workstations 54 and 56 are personal computers configured to communicate with server system 12. Furthermore, fax server 28 communicates with client systems, including a client system 56 using a telephone link. Fax server 28 is configured to communicate with other client systems 38, 40, and 42 as well.

Figure 3:
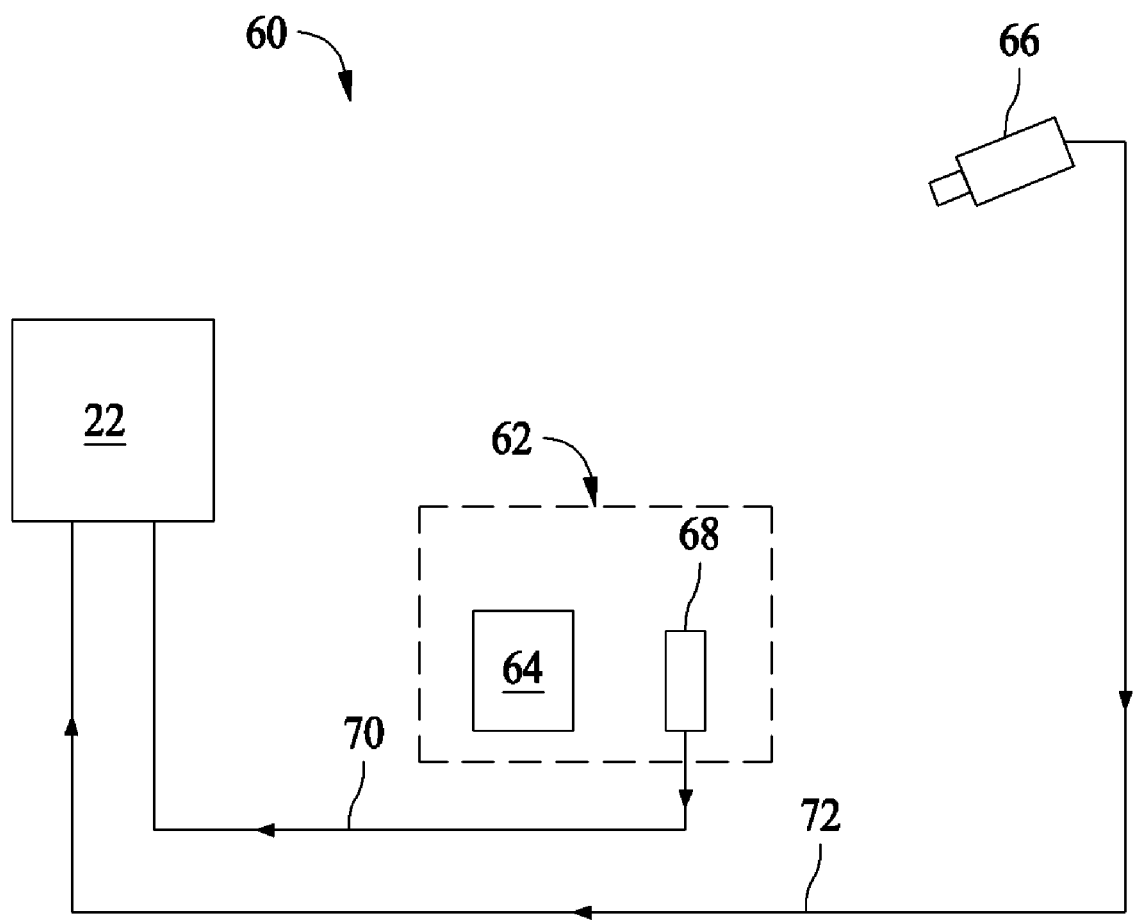
FIG. 3 is a schematic block diagram showing an Inspection Workstation Security System.

FIG. 3 is a schematic block diagram illustrating an Inspection Workstation Security (IWS) system 60 of the exemplary embodiment. More specifically, IWS system 60 includes an inspection workstation 62 including an inspection area 64, DVRUI system 22, a video camera 66, a scanner 68, a first communications link 70 and a second communications link 72. Inspection area 64 includes a mechanism for transporting items of luggage, such as, but not limited to, a conveyor belt, and an open area where luggage may be opened and otherwise manually inspected. Moreover, it should be appreciated that inspection area 64 may be any kind of inspection area typically used for manually inspecting luggage at airports. DVRUI system 22 may be positioned at any location relative to inspection workstation 62 that allows readily viewing recorded luggage inspections. In the example embodiment, video camera 66 is a digital camera. However, it should be appreciated that video camera 66 may be any type of recording device capable of operatively coupling to digital video recording unit 34 of DVRUI system 22. In the example embodiment, the Baggage Identification Number (BIN) is an IATA (International Air Transport Association) code. More specifically, the BIN is a prominently displayed bar code printed on a luggage tag that represents a ten-digit code. It should be appreciated that although the exemplary embodiment describes the BIN as representing a ten-digit code, in other embodiments, the BIN may represent any multi-digit code that enables IWS system 60 to function as described herein. Moreover, it should be appreciated that although the BIN is represented by a bar code in the exemplary embodiment, in other embodiments, the BIN may be any type of symbol or indicator that may be detected and read by scanner 64. Scanner 68 may be any type of scanner capable of identifying and recording the BIN.

First communications link 70 electronically couples scanner 68 to digital video recording unit 34 of DVRUI system 22 such that information may flow through link 70 from scanner 68 to digital video recording unit 34 of DVRUI system 22. Second communications link 72 electronically couples video camera 66 to digital video recording unit 34 of DVRUI system 22, such that information may flow through link 72 from video camera 64 to DVRUI system 22. Thus oriented, the DVRUI 22 system, video camera 66, scanner 68 and workstation 62 constitute IWS system 60.

Figure 4:
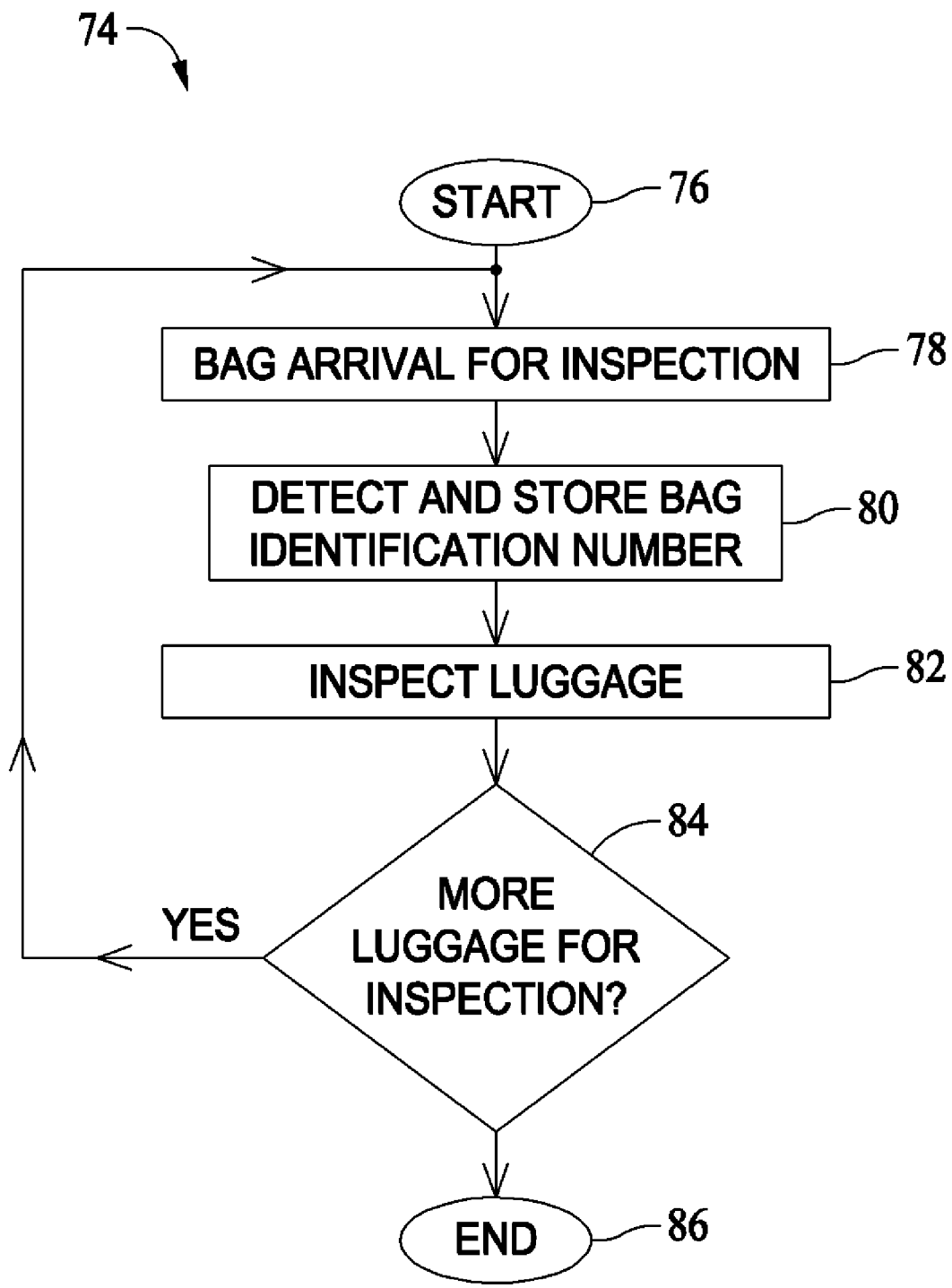
FIG. 4 is a flowchart illustrating exemplary processes utilizing an Inspection Workstation Security System to record and identify luggage inspection events.

FIG. 4 is a flowchart 74 illustrating exemplary processes used by IWS system 60 (shown in FIG. 3) for quickly and accurately recording and identifying luggage inspection events in luggage inspection video footage. For IWS system 60, luggage inspection starts 76 when an item of luggage arrives for inspection 78 and is positioned at inspection workstation 62. The BIN is detected 80 using scanner 68 and a time stamp is assigned to each BIN indicating the time and date the BIN was scanned. The BIN and time stamp data are stored 80 in database 20. The recording unit 34 of DVRUI system 22 associates a multi-digit BIN code tag with each stored BIN, thus creating a link between the digitally recorded luggage inspection and the luggage inspected. In the example embodiment, recording unit 34 stores video footage in ten minute increments. Security personnel manually inspect 82 each item of luggage using conventional techniques and the inspection is recorded by camera 66. After inspecting and otherwise processing an item of luggage, if more luggage is to be inspected 84, processing continues to bag arrival 78. Otherwise, processing ends 86.

Figure 5:
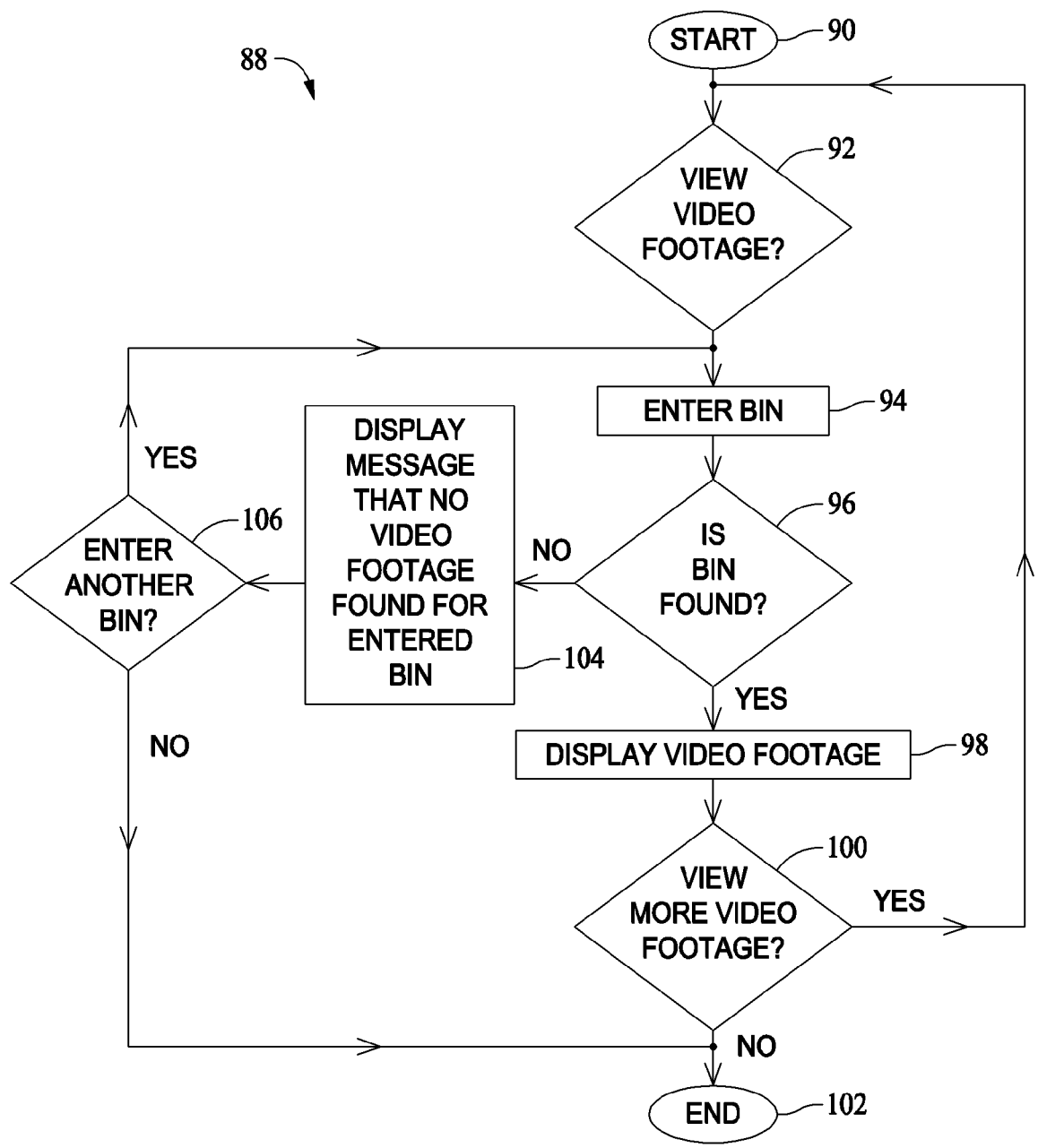
FIG. 5 is a flowchart illustrating exemplary processes utilizing an Inspection Workstation Security System to view video footage.

The stored video inspection footage corresponding to each piece of luggage may be viewed on client systems 14 of DVRUI system 22. FIG. 5 is a flowchart 88 illustrating exemplary processes used by IWS system 60 (shown in FIG. 3) to view recorded luggage inspection video footage. For IWS system 60, video viewing starts 90 by determining whether to view video footage 92 corresponding to a particular luggage inspection. Security personnel enter the corresponding multi-digit BIN code 94 into DVRUI system 22. DVRUI system 22 searches database 20 for the multi-digit BIN code. If the multi-digit BIN code is found 96, the video footage stored in recording unit 34 corresponding to the entered multi-digit BIN code is displayed for viewing 98 on client systems 14. Upon viewing the stored luggage inspection video, proper inspection may be accurately verified and insightful luggage inspection analysis made. If security personnel do not desire to view more stored video inspection footage 100, processing ends 102.

If the entered multi-digit BIN code 94 is not located 96 in database 20, then a message is displayed 104 on client systems 14 that video footage was not found corresponding to the entered BIN code 94. If the user desires to enter another multi-digit BIN code 94, processing continues as described above. Otherwise, if the user does not desire to enter another BIN code 106, processing ends 102.

It should be appreciated that although an exemplary embodiment is described as storing video footage in ten minute increments or segments, in other embodiments, video footage may be stored in any increment that enables IWS system 60 to function as described herein. Each ten minute video footage segment may contain video footage of several luggage inspections. Moreover, parts of the same luggage inspection may span between, or be included in, two different ten minute video segments. As discussed previously, recording unit 34 associates each BIN with the corresponding luggage recording. If a video inspection spans between, or is included in, two different ten minute video footage segments, the same multi-digit BIN code is associated with each ten minute video segment such that both video segments are retrieved and viewed. It should be appreciated that in other embodiments, a stored video inspection may span between, or be included in, any number of video segments that enables IWS system 60 to function as described herein.

In the example embodiment, a digital video recorder accurately records and tracks the date and time of inspection, as well as the BIN. More specifically, a method for recording luggage inspections in airports is provided where a user is able to immediately and accurately access stored video of manual luggage inspections. A scanner identifies a BIN for each piece of luggage inspected, then the BIN is stored and the corresponding video footage is stored on a digital video recording unit. As a result, security personnel are able to accurately and immediately identify and locate a specific luggage inspection without spending time searching through the video footage. Moreover, quickly and accurately verifying proper luggage inspection facilitates reducing the amount of claims paid for lost or damaged personal items and facilitates providing insightful luggage inspection analysis for each item of luggage. If an airplane is subject to a terrorist event, the stored video footage may be used to determine whether a particular item of luggage was the cause of the event. The video footage may also be used in the investigation after a terrorist event.

While the invention has been described in terms of various specific embodiments, the description of the various embodiments is illustrative only and is not to be construed as limiting the invention. Various other modifications and changes may occur to those skilled in the art without departing from the spirit and scope of the invention.

What is claimed is:

1. A method of using a recording device in a luggage inspection system, said method comprising:
   establishing an inspection workstation including an inspection area, a scanner, and a user interface;
   providing an item of luggage to the inspection area;
   positioning the recording device to record a continuous video comprising an inspection of the item of luggage within the inspection area;
   scanning an identification number of the item of luggage using the scanner;
   electronically storing the identification number of the item of luggage by date and time;
   performing the inspection of contents of the item of luggage within the inspection area;
   recording the continuous video of at least the inspection of the item of luggage, wherein the continuous video comprises a plurality of continuous video segments; and
   electronically associating the identification number of the item of luggage with at least one segment of the plurality of continuous video segments of the item of luggage that show the inspection of the item of luggage, wherein a number of the at least one segment is less than a number of the plurality of continuous video segments, wherein said method is operable to be applied to a plurality of items of luggage.

2. A method in accordance with claim 1 further comprising:
entering the identification number of the item of luggage into the user interface after the inspection has been performed; and
retrieving the at least one segment of the continuous video using the entered identification number.

3. A method in accordance with claim 1 wherein scanning an identification number comprises scanning a bar code representing a unique identification number of the item of luggage.

4. A method in accordance with claim 1 further comprising coupling the scanner to the user interface using a communications link.

5. A method in accordance with claim 1 further comprising coupling the recording device to the user interface using a communications link.

6. A method in accordance with claim 1 wherein recording the continuous video comprises storing the recorded inspection on a plurality of video footage segments.

7. A method in accordance with claim 1 wherein associating the identification number of the item of luggage with at least one segment comprises creating a link between the item of luggage corresponding to the identification number and the recorded inspection.

8. A method in accordance with claim 1 further comprising verifying that the contents of the item of luggage were not one of damaged or lost during the inspection by reviewing the at least one segment of the continuous video after the inspection has been performed.

9. A system for recording information pertaining to a luggage inspection, said system comprising:
an inspection workstation comprising an inspection area, a scanner, and a user interface including a recording unit;
a recording device configured to record a continuous video comprising an inspection of at least an item of luggage within the inspection area, said recording device operatively coupled to said user interface and configured to store the continuous video in the recording unit, the continuous video comprising a plurality of continuous video segments; and
an identification number associated with the item of luggage,
wherein said user interface is configured to:
electronically store the identification number of the item of luggage by date and time;
electronically associate the identification number of the item of luggage with at least one segment of the plurality of continuous video segments that shows the inspection of the item of luggage, wherein a number of the at least one segment is less than a number of the plurality of continuous video segments; and
electronically retrieve the at least one segment of the continuous video using the identification number,
wherein said system is operable to be applied to a plurality of items of luggage.

10. A system in accordance with claim 9 wherein said identification number comprises a bar code representing a unique identification number of the item of luggage.

11. A system in accordance with claim 9 wherein a communications link couples said scanner to said user interface.

12. A system in accordance with claim 9 wherein a communications link couples said recording device to said user interface.

13. A system in accordance with claim 9 wherein the continuous video of at least the inspection of the item of luggage is stored on a plurality of video footage segments.

14. A system in accordance with claim 9 wherein said identification number provides a link between the at least one segment of the continuous video stored on said recording unit and the item of luggage.

15. An apparatus for viewing luggage inspections, said apparatus comprising:
an inspection area, a scanner, and a user interface;
a recording device configured to record a continuous video of an item of luggage in said inspection area, the continuous video comprising a plurality of continuous video segments, said recording device operatively coupled to said user interface and configured to electronically store the continuous video in said user interface; and
an identification number associated with the item of luggage, the identification number detected by said scanner and transmitted to said user interface,
wherein said user interface is configured to:
electronically store the identification number by date and time;
electronically associate the identification number with at least one segment of the continuous video that shows an inspection of the item of luggage, wherein a number of the at least one segment is less than a number of the plurality of continuous video segments; and
electronically retrieve the at least one segment of the continuous video using the identification number,
wherein said apparatus is operable to be applied to a plurality of items of luggage.

16. An apparatus in accordance with claim 15 wherein said identification number comprises a bar code representing a unique identification number of the item of luggage.

17. An apparatus in accordance with claim 15 wherein a communications link couples said scanner to said user interface.

18. An apparatus in accordance with claim 15 wherein a communications link couples said recording device to said user interface.

19. An apparatus in accordance with claim 15 wherein the continuous video of the inspection of the item of luggage is stored on a plurality of video footage segments.

20. An apparatus in accordance with claim 15 wherein said identification number provides a link between the at least one segment of the continuous video stored on said user interface and said item of luggage.

* * * * *